United States Patent Office 3,352,833
Patented Nov. 14, 1967

3,352,833
ACID STABILIZATION AND BASE REACTIVA-
TION OF WATER-SOLUBLE WET-STRENGTH
RESINS
Ralph H. Earle, Jr., Claymont, Del., assignor to Hercules
Incorporated, a corporation of Delaware
No Drawing. Filed Dec. 31, 1963, Ser. No. 334,908
The portion of the term of the patent subsequent to
Mar. 28, 1984, has been disclaimed
15 Claims. (Cl. 260—78)

This invention relates to the preparation of acid-stabilized, base reactivatable polyamide-epichlorohydrin wet-strength resins and to the base reactivation treatment of these and similar acid-stabilized resins of this type to restore, at least in large part, any wet-strength imparting characteristics of such resins which have been reduced or lost as a direct and/or indirect result of said acid stabilization treatment.

Very efficient wet-strength resins can be prepared by reacting epichlorohydrin with polyamides containing secondary amino nitrogens. In the preparation of these resins the epicholorohydrin reacts with the secondary amino nitrogens to form chlorohydrin groups and these undergo further reactions which result in the formation of reactive cross-linking groups.

It has been proposed to stabilize aqueous solutions of these polyamide-epichlorohydron resins against gelation by adjusting the pH of the aqueous resin solution to about 2.0 by the addition of an acid, e.g., a mineral acid such as sulfuric acid or hydrochloric acid. However, resin solutions stabilized in this manner and containing more than about 20% solids gel in a matter of a few weeks. While this can be prevented and stability against gelation improved by readjusting the pH of the solution to about 2.0 after it has aged for a few days, there is the disadvantage that storage facilities must be supplied for aging the resin solutions. Moreover, during subsequent storage, these acid stabilized resins lose wet-strength imparting characteristics which, when the storage period is relatively long, has represented a substantial economic loss.

It has now been found that aqueous polyamide-epichlorohydrin resin solutions of the above-described type can be satisfactorily stabilized by the addition thereto of a water-soluble acid, preferably a hydrogen halide acid such as hydrochloric acid, in an amount sufficient to (1) stabilize the epichlorohydrin moiety of any chlorohydrin groups as the corresponding aminochlorohydrin hydrochloride,

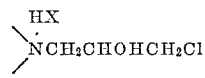

where X is an acid anion, and (2) to cause chloride ion to react with active cross-linking groups to reform epihalohydrin moieties which are likewise stabilized as the corresponding aminochlorohydrin hydrochloride. Water-soluble acids, other than hydrogen halide acids, can be used if the chloride ion concentration of the reaction mixture is sufficiently high, e.g., at least 0.1 N, and the reactivity of nucleophilicity of the acid anion is sufficiently low that the reactive cross-linking groups are converted essenitally completely to the chlorohydrin.

Resins stabilized in the above manner have improved stability against gelation without the necessity of readjusting pH following an aging period. However, such acid stabilization treatment does result in reduced wet-strength characteristics of these resins. Now it has been found, as a further feature of the invention, that the original wet-strength imparting characteristics of these resins can be substantially completely restored by reactivation with a base. This base reactivation treatment, moreover, has been found to be applicable to any polyamide-epichlorohydrin resin of the type herein described where wet-strength characteristics have been reduced, either initially or on storage, as a result of acid stabilization. Thus, resins of this type which have lost wet strength on storage following acid stabilization by adding acid, e.g., hydrochloric acid, to a pH of 2.0 following by aging for a few days and readjustment of the pH to 2.0 can be effectively treated by the base reactivation treatment of the invention.

In the preparation of the polyamide-epichlorohydrin resins of the present invention, the polyamide is first formed by reacting a dicarboxylic acid with a polyalkylene polyamine, preferably in aqueous solution, under conditions such as to produce a water-soluble, long-chain polyamide containing the recurring groups

where $n$ and $x$ are each 2 or more and R is the divalent organic radical of the dicarboxylic acid. The polyamide is then reacted with epichlorohydrin, stabilized by addition of acid and then reactivated with base preferably just before using.

The dicarboxylic acids contemplated for use in preparing the resins of the invention are the saturated aliphatic dicarboxylic acids preferably containing from 3 to 8 carbon atoms, such as malonic, succinic, glutaric, adipic and so on, together with diglycolic acid. Of these, diglycolic acid and the saturated aliphatic dicarboxylic acids having from 4 to 6 carbon atoms in the molecule, namely, succinic, glutaric and adipic, are most preferred. Blends of two or more of these dicarboxylic acids may also be used, as well as blends of one or more of these with higher saturated aliphatic dicarboxylic acids such as azelaic and sebacic, as long as the resulting long-chain polyamide is water soluble or at least water dispersible.

A variety of polyalkylene polyamines including polyethylene polyamines, polypropylene polyamines, polybutylene polyamines and so on may be employed herein of which the polyethylene polyamines represent an economically preferred class. More specifically, the polyalkylene polyamines of this invention are polyamines containing two primary amine groups and at least one secondary amine group in which the nitrogen atoms are linked together by groups of the formula —$C_nH_{2n}$— where $n$ is a small integer greater than unity and the number of such groups in the molecule ranges from two up to about eight and preferably up to about four. The nitrogen atoms may be attached to adjacent carbon atoms in the group —$C_nH_{2n}$— or to carbon atoms further apart, but not to the same carbon atom. This invention contemplates not only the use of such polyamines as diethylenetriamine, triethylenetetramine, tetraethylenepentamine, dipropylenetriamine, and the like, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia, and ethylenediamine, is a very satisfactory starting material. Most preferred are the polyethylene polyamines containing from two to four ethylene groups, two primary amine groups, and from one to three secondary amine groups.

The term "polyalkylene polyamine" employed in the claims, therefore, refers to and includes any of the polyalkylene polyamines referred to above or to a mixture of such polyalkylene polyamines.

It is desirable, in sme cases, to increase the spacing of secondary amine groups on the polyamide molecule in order to change the reactivity of the polyamide-epichlorohydrin complex. This can be accomplished by substituting an aliphatic diamine such as ethylenediamine, propylenediamine, hexamethylenediamine, or a reterocyclic diamine such as piperazine or the like for a portion of the polyalkylene polyamine. For this purpose up to about 60% of the polyalkylene polyamine may be replaced by a molecular equivalent amount of the diamine. Usually, a replacement of about 30% or less will serve the purpose.

The temperatures employed for carrying out the reaction between the dicarboxylic acid and the polyalkylene polyamine may vary from about 110° C. to about 250° C. or higher at atmospheric pressure. For most purposes, however, temperatures between about 160° C. and 210° C. have been found satisfactory and are preferred. Where reduced pressures are employed, somewhat lower temperatures may be utilized. The time of reaction depends on the temperatures and pressures utilized and will ordinarily vary from about ½ to 2 hours, although shorter or longer reaction times may be utilized, depending on reaction conditions. In any event, the reaction is desirably continued to substantial completion for best results.

In carrying out the reaction, it is preferred to use an amount of dicarboxylic acid sufficient to react substantially completely with the primary amine groups of the polyalkylene polyamine but insufficient to react with the secondary amine groups to any substantial extent. This will usually require a mole ratio of polyalkylene polyamine to dicarboxylic acid of from about 0.9:1 to about 1.2:1 and preferably from about 0.92:1 to about 1.14:1. However, mole ratios of from about 0.8:1 to about 1.4:1 may be used with quite satisfactory results. Mole ratios outside of these ranges are generally unsatisfactory. Thus, mole ratios below about 0.8:1 result in a gelled product or one having a pronounced tendency to gel while mole ratios above 1.4:1 result in low molecular weight polyamides. Such products do not produce efficient wet-strength resins when reacted with epichlorohydrin.

In converting the aqueous polyamide, formed as above described, to a cationic thermosetting resin, it is reacted with epichlorohydrin at a temperature from about 25° C. to about 100° C. and preferably from about 45° C. to about 70° C. and held at this temperature until the viscosity of the solution has reached the desired Gardner viscosity, i.e., at least <B, and preferably at least D, for about 25% solids resins, and at least M, and preferably at least X, for about 50% solids resins. This reaction is preferably carried out in aqueous solution to moderate the reaction. The reaction may also be moderated by decreasing the pH of the aqueous polyamide solution with acid prior to addition of epichlorohydrin or immediately after the addition of epichlorohydrin. This adjustment is preferably made to a pH 8.5–9.5, but may be made to pH 7.5 in some cases with quite satisfactory results. Any suitable acid, e.g., mineral acids, can be used for this purpose. When the desired viscosity is reached, the product is cooled to about 25° C. and then stabilized by the addition of an acid in the manner hereinafter described.

In the polyamide-epichlorohydrin reaction, it is preferred to use sufficient epichlorohydrin to convert all secondary amine groups to tertiary amine groups and/or quaternary ammonium groups including cyclic structures. However, more or less may be added to moderate or increase reaction rates. In general, it is contemplated utilizing from about 0.5 mole to about 1.8 moles of epichlorohydrin per mole polyamide secondary amine. It is preferred to utilize from about 0.9 mole to about 1.5 moles of epichlorohydrin per mole of polyamide secondary amine group.

In accordance with the invention, the aqueous resin solution, produced as above described, is stabilized by the addition of a water-soluble acid, preferably a hydrogen halide acid, e.g., hydrochloric acid, in an amount sufficient to stabilize the epichlorohydrin moiety of any chlorohydrin groups as the corresponding aminochlorohydrin hydrochloride,

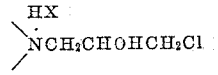

where X is an acid anion, and to cause chloride ion to react with any active cross-linking groups to reform epihalohydrin moieties which are likewise stabilized as the corresponding aminochlorohydrin hydrochloride. All the acid can be added at once or it can be added in increments or continuously over a period of time, e.g., 5 to 120 minutes, while heating at temperatures from about 40° C. to about 80° C. or over a period of several days to several weeks at room temperature. Once the resin is effectively stabilized, the pH can then be adjusted to 2.0 to 7.0 wtih a base to prevent irreversible hydrolysis of the polyamide backbone. Sufficient water is then added to adjust the solids content of the aqueous resin solution to the desired amount.

The amount of water-soluble acid required will usually approach stoichiometric equivalence to the amount of epichlorohydrin used to prepare the resin. However, quite satisfactory results are obtained if the ratio of equivalents of water-soluble acid to equivalents (moles) of epichlorohydrin is from about 0.3 to about 1.2.

Prior to acid stabilization, as hereinabove described, the polyamide-epichlorohydrin resins of the invention have excellent wet-strengthening properties. However, as a result of the acid stabilization treatment, there is a reduction in the wet-strengthening characteristics of these resins, the amount of such reduction depending on the extent of the acid stabilization treatment. It has been found, as another aspect of this invention, that the wet-strengthening properties of these resins can be substantially restored and, in some cases, improved by a base reactivation treatment. This treatment involves adding to the resin solution an amount of base, either as a solid or as a solution, sufficient to reconvert the chlorohydrin groups to reactive cross-linking groups. This will usually require an amount of base approximately chemically equivalent to the amount of stabilizing acid present. However, from about 0.25 to about 2.5 times this amount can be used with some advantage. The base can be added to the resin solution as prepared or after it is diluted preparatory to use. Following base reactivation, the resin solution can be used immediately, aged for from 10 minutes to one week or more and then used, aged and then diluted for storage, or prepared and diluted immediately.

Both organic and inorganic bases can be used herein. Typical bases which can be used are the alkali metal hydroxides, carbonates and bicarbonates, calcium hydroxide, pyridine, benzyltrimethylammonium hydroxide, tetramethylammonium hydroxide, tetraethylammonium hydroxide, and so on.

While the base reactivation treatment phase of this invention is particularly designed for use in connection with the acid stabilization treatment of the invention, it is also effective for the treatment of polyamide-epichlorohydrin resins of the type herein disclosed where wet strength has been reduced and/or lost, either initially or on storage, as a result of an acid stabilization treatment.

Following base reactivation, as hereinabove described, the aqueous resin solutions can be applied to paper or other felted cellulosic products by tub application or by spraying, if desired. Thus, for example, performed and partially or completely dried paper can be impregnated by immersion in, or spraying with, an aqueous solution of the resin, following which the paper can be heated for about 0.5 to 30 minutes at temperatures of 90° C. to 100° C. or higher to dry same and cure the resin to a water-insoluble condition. The resulting paper has greatly increased wet strength, and therefore this method is well suited for the impregnation of paper towels, absorbent tissue and the like, as well as heavier stocks such as wrapping paper, bag paper and the like, to impart wet-strength characteristics thereto.

The preferred method of incorporating these resins in paper, however, is by internal addition prior to sheet formation, whereby advantage is taken of the substantivity of the resins for hydrated cellulosic fibers. In practicing this method, an aqueous solution of the activated resins in its uncured and hydrophilic state is added to an aqueous suspension of paper stock in the beater, stock chest, Jordan engine, fan pump, head box or at any other suitable point ahead of sheet formation. The sheet is then formed and dried in the usual manner, the "off-the-machine" wet strength, as previously indicated, being relatively high as compared with other types of alkaline-curing wet-strength resins.

In some commercial applications the "off-the-machine" wet strength obtained with the cationic resins of the invention is ample and further curing is not necessary. However, in those commercial applications where additional wet strength is desired, the paper may be subjected to a heat treatment under alkaline conditions, i.e., at pH's from about 7 to 11, for about 10 to 60 minutes at a temperature of about 105° C. to about 150° C. Additional wet strength may also be gained by allowing the paper to age under the normal paper storage conditions.

The cationic thermosetting resins herein disclosed impart wet strength to paper when present therein in relatively small amounts, i.e., about 0.01% or more, based on the dry weight of the paper. Generally, it will be desirable to use from about 0.1–3% by weight, based on the dry weight of the fiber. However, amounts up to 5% or more by weight, based on the dry weight of the fiber, can be used for special effects.

The following examples will illustrate specific embodiments of the invention. The parts referred to in the examples are parts by weight.

*Example 1*

Two hundred twenty-five parts of diethylenetriamine and 108 parts of water were placed in a reaction vessel and agitated. To this was added 327 parts of adipic acid. After the acid had dissolved in the amine, the solution was heated to 165–170° C. and held there until the reaction was completed. Then 503 parts of water was added. The resulting polyamide solution contained about 51.6% solids and had an intrinsic viscosity at 25° C. of 0.141 in 1 N ammonium chloride solution.

Two hundred sixty and eight-tenths grams of the above polyamide solution was dissolved in 804 ml. of water and heated to 40° C. Seventy grams of epichlorohydrin was added over a two-minute interval following which the reaction mixture was heated at 70° C. for one hour during which time the Gardner-Holdt viscosity at 25° C. rose to >D. The reaction was terminated by adding 22.6 ml. of 37% aqueous hydrochloric acid. The pH of the resulting solution was 1.0.

*Example 2*

A resin was prepared in the same manner as in Example 1 except that the resin was stabilized by adding only 15 ml. of 37% aqueous hydrochloric acid so that the pH was 2.0.

*Example 3*

In the same manner as in Example 1, 1.664 g. of polyamide dissolved in 552 ml. of water was reacted with 552 g. of epichlorohydrin. The epichlorohydrin was added at 25–30° C. The reaction proceeded at 25–30° C. for 18 hours at which time a 692 g. portion of the reaction mixture was withdrawn and acidified with 58 ml. of 37% aqueous hydrochloric acid. After an additional six hours at ambient temperature, the pH of this sample was adjusted to 1.4 with an additional 12 ml. of 37% aqueous hydrochloric acid and the sample designated A. A 617 g. portion of the original reaction mixture, removed at the same time as the 692 g. sample, was allowed to stand for an additional six hours at 25° C., at which time the pH was adjusted to 1.5 with 42 ml. of 37% aqueous hydrochloric acid. This resin sample was stabilized by heating at 60–70° C. for one hour during which time the pH of the reaction mixture was maintained at 2.0 by the continuous addition of 19 ml. of aqueous hydrochloric acid. This sample was designated B.

*Example 4*

The polyamide used in this experiment was prepared by reacting 1.00 mole of a 98% pure sample of diethylenetriamine with 1.00 mole of adipic acid. Seventy and three-tenths grams of this polymer was reacted with 30.5 g. of epichlorohydrin in aqueous solution at 61.5% solids level for six hours at 30° C. The reaction was terminated by addition of 25 ml. of 37% aqueous hydrochloric acid. The pH of this solution was 1.5.

*Example 5*

This resin was prepared using 213 g. of polyamide and 138 g. of epichlorohydrin at 50% solids. The polyamide used in this experiment was prepared by reacting 0.95 mole of diethylenetriamine with 1.00 mole of adipic acid. The reaction with epichlorohydrin was run at 40–50° C. and required 203 minutes. At this time the Gardner-Holdt viscosity of the reaction mixture was >W at 25° C. The reaction was terminated by addition of 60 ml. of 37% aqueous hydrochloric acid. The resin was stabilized by heating the solution at 50° C. for 20 minutes while the pH was maintained below 2.0 by the continuous addition of 81 ml. of 37% aqueous hydrochloric acid. The final pH of the solution was 1.6.

*Example 6*

In the same manner as in Example 1, 416 g. of polyamide with no additional dilution water was reacted with 92.5 g. of epichlorohydrin. The reaction proceeded at 25° C. for 24 hours at which time the Gardner-Holdt viscosity at 25° C. was Z. The pH was adjusted to 2.0 with 64 ml. of 37% aqueous hydrochloric acid and the resin solution temperature rose to 50° C. After 90 minutes, the pH, which had risen to 2.3, was readjusted to 2.0 with 1.0 ml. of 37% aqueous hydrochloric acid. The resin contained 57% solids.

The resins of Examples 1–6 were evaluated for 90° F. storage stability. The results are set forth in Table 1 below.

TABLE 1

| Resin | T.S. (Calculated) | Original Viscosity | 90° F. Stability | | Ratio of Equiv. of Acid to EPI Used for Stabilization |
|---|---|---|---|---|---|
| | | | Age (Days) | Viscosity | |
| Example 1 | 18.4 | E | 75 | G | 0.35 |
| Example 2 | 18.3 | >D | 7 | Gel | 0.26 |
| Example 3A | 51.5 | <G | 90 | R | 0.55 |
| Example 3B | 51.5 | U | 90 | U | 0.55 |
| Example 4 | 58.0 | V | 90 | >U | 0.76 |
| Example 5 | 48.5 | T/U | 43 | Gel | 0.64 |
| Example 6 | 57.0 | >U | 90 | >U | 0.77 |

Example 7

The reaction described in Example 3 above was repeated. The reaction was allowed to proceed for 48 hours at 25° C. The reaction mixture was divided into six portions, five weighing 460 g. each and one weighing 409.4 g. These samples were designated 1 through 6, respectively. They were stabilized by addition of various acids as summarized in Table 2 below. The 90° F. stability of these samples is given in Table 2.

Example 9

A resin was prepared as in Example 8 except that the resin was stabilized at about 25% solids by a combination of formic and sulfuric acids, the formic acid being added first to a pH of about 3.5 and then the sulfuric to a pH of about 2.5.

Example 10

Tacoma bleached kraft pulp, Rayonier bleached kraft pulp, or Weyerhaeuser alpha pulp was beaten at 2.5% con-

TABLE 2.—EXAMPLE 7 (STABILIZATION OF PRODUCT)

| Sample Designation | Acid Used for Stabilization | Wt. Acid Used | Equivalents, Acid/EPI | pH | Original Viscosity, 25° C. Gardner-Holdt | Original Viscosity, 25° C. Brookfield, cps. | Viscosity After Aging for 50 Days at 90° F. | Total Solids (Calculated) |
|---|---|---|---|---|---|---|---|---|
| 1 | 98% $H_2SO_4$ | 26.2 | 0.514 | 2.0 | <W | 1,250 | T | 53.2 |
| 2 | 85% $H_3PO_4$ | 94.4 | 2.45 | 2.0 | W | 1,325 | D/E | 56.6 |
| 3 | 70% $HNO_3$ | 44.6 | 0.50 | 2.0 | V | 888 | V | 52.5 |
| 4 | 37% HCl | 52.0 | 0.51 | 2.0 | V | 913 | Z-1 | 49.2 |
| 5 | Glacial HOAC | 110.0 | 1.82 | 3.9 | V/W | 1,113 | I | 60.2 |
| 6 | 88% HCOOH | 75.0 | 1.80 | 2.8 | >U | 800 | <D | 56.0 |

Example 8

A polyamide was prepared as follows: 200 parts by weight of diethylenetriamine and 96.3 parts by weight of water were charged to a reaction vessel equipped with an agitator. The agitator was started and 290 parts by weight of adipic acid was added at the rate of about 18.7 parts per six minutes. After the acid was added, the temperature of the charge was raised to 170° C.±5° C. and held there for 1.5 to 3 hours. The reaction mixture was then cooled to 140° C. and diluted with sufficient water to adjust the solids content to about 50%. The product was then cooled to 25° C.

To 60 parts by weight of this polyamide solution was added 225 parts by weight of water. This solution was heated to 50° C. and 12.5 parts by weight of epichlorohydrin was added dropwise over a period of 11 minutes. The contents of the flask was then heated to 60-70° C. until it had attained a Gardner-Holdt viscosity of >E. Then 150 parts by weight of water was added to the product and it was cooled to 25° C. Eleven parts by weight of 10% sulfuric acid was then added to adjust the pH to 5.0. The product contained 10% solids and had a Gardner-Holdt viscosity of C/D.

This polyamide-epichlorohydrin resin has good stability against gelation but loses wet-strength efficiency on aging. It, or one similarly made, is used as a control against which wet-strength efficiency of the acid-stabilized, base reactivatable resins of the invention is measured.

sistency in a cycle beater to 750 cc. Schopper-Riegler freeness. The pH of the pulp slurry was adjusted to 7.5. The pulp was diluted to 0.28% consistency in the proportioner of a standard Noble and Wood handsheet apparatus. The resins to be evaluated were added to the proportioner as 2% solids solutions. Where base activated resins were used, the same were prepared by first diluting the resin solution to 20-25% solids. An amount of 10 N aqueous sodium hydroxide approximately equivalent to the amount of epichlorohydrin plus hydrochloric acid used to make the resin sample was then added with stirring. These resin solutions were then aged four hours at room temperature, diluted to 2% resin solids and used promptly.

Handsheets were prepared using a closed system in which the dilution water used had the following composition:

| | P.p.m. |
|---|---|
| Calcium hardness | 100±5 |
| MO alkalinity | 50±5 |
| Sulfate | 100 |
| Sodium | 26 |
| Chloride | 38 | pH, 7.5.

A portion of the resulting handsheets was given an additional cure by heating one hour at 105° C. The sheets tested for wet strength were soaked for 2 hours in distilled water prior to testing. The results are summarized in Tables 3, 4 and 5 below.

TABLE 3.—WET-STRENGTH EFFICIENCY

| Resin | Wet Tensile lb./in. Width | | | | | |
|---|---|---|---|---|---|---|
| | Uncured | | | Cured | | |
| | 0.4% | 1.0% | 2.0% | 0.4% | 1.0% | 2.0% |
| Example 8 [1] | 3.6 | 4.5 | 5.1 | 5.7 | 7.4 | 8.1 |
| Example 1 (3 weeks old unactivated) [1] | 2.7 | 3.8 | 4.9 | 4.7 | 6.9 | 8.4 |
| Example 1 (21 days old base activated) [1] | 3.1 | 4.3 | 5.3 | 5.2 | 7.2 | 8.3 |
| Example 1 (74 days old base activated) [1] | 2.9 | 4.6 | 5.7 | 4.8 | 7.5 | 8.9 |
| Example 3A [1] (base activated) | 2.9 | 4.5 | 6.3 | 4.4 | 6.5 | 8.5 |
| Example 3B [1] (base activated) | 3.2 | 4.6 | 6.4 | 4.6 | 6.2 | 8.3 |
| Like Example 8 resin [2] | 2.0 | 2.5 | 2.5 | 4.0 | 4.6 | 4.7 |
| Example 3A [2] (base activated) | 1.7 | 2.6 | 3.0 | 3.0 | 4.5 | 5.8 |
| Example 3B [2] (base activated) | 1.7 | 2.9 | 3.7 | 3.3 | 4.6 | 6.0 |
| Example 6 (17 days old base activated) [1] | 3.2 | 4.6 | 6.4 | 4.8 | 6.2 | 7.7 |
| Example 6 (1 year old unactivated) [1] | 1.2 | 1.9 | 2.8 | 2.3 | 3.9 | 5.5 |
| Example 6 (1 year old base activated) [1] | 2.5 | 4.7 | 5.8 | 4.9 | 7.5 | 9.4 |

[1] 40 lb. BW RBK Handsheets.
[2] 40 lb. BW Alpha Pulp Handsheets.

TABLE 4.—WET-STRENGTH EFFICIENCY, 40 LB. RBK HANDSHEETS

| Resin | | Wet Tensile lb./in. Width | | | | | |
|---|---|---|---|---|---|---|---|
| Designation | Acid Used for Stabilization | Uncured | | | Cured | | |
| | | 0.4% | 1.0% | 2.0% | 0.4% | 1.0% | 2.0% |
| Like Example 8 | | 4.2 | 5.5 | 6.1 | 6.4 | 8.5 | 9.8 |
| Example 7—1 [1] | $H_2SO_4$ | 3.5 | 5.1 | 7.2 | 5.1 | 7.4 | 9.9 |
| Example 7—2 [1] | $H_3PO_4$ | 2.6 | 3.7 | 5.0 | 4.0 | 5.9 | 7.8 |
| Example 7—2 [2] | $H_3PO_4$ | 2.4 | 3.4 | 4.3 | 3.4 | 4.9 | 5.8 |
| Example 7—2 [3] | $H_3PO_4$ | 0.8 | 1.0 | 1.1 | 1.2 | 2.0 | 2.6 |
| Example 7—3 [1] | $HNO_3$ | 3.8 | 5.6 | 7.5 | 5.4 | 8.0 | 10.1 |
| Example 7—4 [1] | HCl | 3.6 | 5.7 | 7.5 | 5.4 | 7.7 | 10.3 |
| Example 7—5 [1] | HOAC | 2.0 | 3.0 | 4.0 | 3.0 | 4.5 | 6.1 |
| Example 7—6 [1] | HCOOH | 2.1 | 3.2 | 4.1 | 3.2 | 4.8 | 6.3 |

[1] Activated with base (sodium hydroxide) equivalent to epichlorohydrin plus acid after 37 days' aging.
[2] Activated with base (sodium hydroxide) equivalent to epichlorohydrin plus acid after 4 months' aging.
[3] Aged 4 months, unactivated.

TABLE 5.—CURED WET TENSILE (lb./in. WIDTH)

| Age, Days | Resin (0.4%) | | Resin (1.0%) | | Resin (2.0%) | |
|---|---|---|---|---|---|---|
| | Example 8 | Example 9 | Example 8 | Example 9 | Example 8 | Example 9 |
| 0 | 7.6 | 7.1 | 10.1 | 9.6 | 10.1 | 11.9 |
| 30 | 7.0 | 6.6 | 9.6 | 8.9 | 10.7 | 10.5 |
| 60 | 6.8 | 6.3 | 9.7 | 8.3 | 11.5 | 10.6 |
| 90 | 6.9 | 5.8 | 10.0 | 8.1 | 11.7 | 9.8 |
| 180 | 5.6 | 4.4 | 8.3 | 6.5 | 9.6 | 8.1 |

It is thus apparent that the present invention provides an improved process for the acid stabilization of polyamide-epichlorohydrin resins and for the base reactivation of these as well as other acid-stabilized polyamide-epichlorohydrin resins, the wet-strength characteristics of which have been reduced, directly or indirectly, as a result of acid stabilization.

What I claim and desire to protect by Letters Patent is:

1. A process which comprises (1) reacting a polyalkylene polyamine having two primary amine groups and at least one secondary amine group with a dicarboxylic acid selected from the group consisting of diglycolic acid and $C_3$ to $C_8$ saturated aliphatic dicarboxylic acids to form a water-soluble long chain polyamide containing secondary amine groups, the mole ratio of polyalkylene polyamine to dicarboxylic acid being from about 0.8 to 1 to about 1.4 to 1, (2) reacting the polyamide in aqueous solution with epichlorohydrin in a mole ratio of epichlorohydrin to secondary amine groups of said polyamide of from about 0.5 to 1 to about 1.8 to 1 to form an aqueous solution of a water-soluble cationic thermosetting resin, (3) reacting the resin thus formed, in aqueous solution, with from about 0.3 equivalent to about 1.2 equivalents per equivalent of epichlorohydrin, of a water-soluble acid until the epoxide groups are converted substantially to the correspodning halohydrin groups.

2. The method of claim 1 in which the acid is a hydrogen halide acid.

3. The method of claim 2 in which the hydrogen halide acid is hydrochloric acid.

4. The method of claim 2 in which the hydrogen halide acid is hydrobromic acid.

5. The method of claim 2 in which the hydrogen halide acid is hydrofluoric acid.

6. The method of claim 2 in which the hydrogen halide acid is hydroiodic acid.

7. The method of claim 1 in which the acid is sulfuric acid.

8. The method of claim 1 in which the acid is nitric acid.

9. The method of claim 1 in which the acid is phosphoric acid.

10. The method of claim 1 in which the acid is acetic acid.

11. The method of claim 1 wherein from about 0.25 to about 2.5 equivalents, per equivalent of water-soluble acid, of a base is reacted with the aqueous resin solution.

12. The method of reactivating an aqueous solution of a polyamide-epichlorohydrin resin which has been reduced in its original wet-strength characteristics as a result of an acid stabilization treatment, which comprises adding to said aqueous resin solution a sufficient amount of a base to substantially neutralize the acid used for stabilization whereby the chlorohydrin groups can react to form reactive cross-linking groups.

13. The method of claim 12 in which the amount of base is from about 0.25 equivalent to about 2.5 equivalents per equivalent of water-soluble acid.

14. The method of claim 13 in which the base is sodium hydroxide.

15. The method of claim 13 in which the acid is hydrochloric acid and the base is sodium hydroxide.

References Cited

UNITED STATES PATENTS

| 2,926,154 | 2/1960 | Kein | 260—78 |
| 2,961,347 | 11/1960 | Floyd | 260—78 |
| 3,224,990 | 12/1965 | Babcock | 260—78 |

FOREIGN PATENTS 616,879  3/1961  Canada.

WILLIAM H. SHORT, *Primary Examiner.*

H. D. ANDERSON, *Assistant Examiner.*